US011580659B2

(12) United States Patent
Wu et al.

(10) Patent No.: US 11,580,659 B2
(45) Date of Patent: Feb. 14, 2023

(54) METHOD FOR SIZE ESTIMATION BY IMAGE RECOGNITION OF SPECIFIC TARGET USING GIVEN SCALE

(71) Applicant: NATIONAL APPLIED RESEARCH LABORATORIES, Taipei (TW)

(72) Inventors: Jyh-Horng Wu, Hsinchu (TW); Chien-Hao Tseng, Hsinchu (TW); Meng-Wei Lin, Hsinchu (TW); Ting-Shuan Yeh, Hsinchu (TW); Yi-Hao Hsiao, Hsinchu (TW); Shi-Wei Lo, Hsinchu (TW); Fang-Pang Lin, Hsinchu (TW); Hsin-Hung Lin, Hsinchu (TW); Jo-Yu Chang, Hsinchu (TW)

(73) Assignee: National Applied Research Laboratories, Taipei (TW)

(*) Notice: Subject to any disclaimer, the term of this patent is extended or adjusted under 35 U.S.C. 154(b) by 54 days.

(21) Appl. No.: 16/907,851

(22) Filed: Jun. 22, 2020

(65) Prior Publication Data
US 2021/0104059 A1 Apr. 8, 2021

(30) Foreign Application Priority Data

Oct. 8, 2019 (TW) .................................. 108136334

(51) Int. Cl.
*G06T 5/00* (2006.01)
*G06T 7/62* (2017.01)
*G06V 10/40* (2022.01)
*G06V 20/56* (2022.01)

(52) U.S. Cl.
CPC ................ *G06T 7/62* (2017.01); *G06T 5/007* (2013.01); *G06V 10/40* (2022.01); *G06V 20/56* (2022.01)

(58) Field of Classification Search
CPC . G06T 7/62; G06T 5/007; G06T 2207/30184; G06T 2207/30192; G06T 2207/30236; G06T 2207/10032; G06T 2207/30232; G06K 9/00791; G06K 9/46; G06K 9/0063; G06K 9/6232; G06K 9/6857; G06K 9/00664
See application file for complete search history.

(56) References Cited

U.S. PATENT DOCUMENTS

| 2016/0203611 | A1* | 7/2016 | Datta | H04N 7/18 |
| | | | | 382/106 |
| 2016/0363990 | A1* | 12/2016 | Key | G01G 19/52 |
| 2017/0090730 | A1* | 3/2017 | Knodt | G06T 7/62 |
| 2018/0109703 | A1* | 4/2018 | Steffanson | H04N 5/2253 |

FOREIGN PATENT DOCUMENTS

| CN | 107218887 A | * | 9/2017 | ............. G01B 11/00 |
| CN | 108352068 A | * | 7/2018 | ............... G06T 7/50 |
| CN | 110148166 A | * | 8/2019 | |
| WO | WO-2018157513 A1 | * | 9/2018 | ............. G01B 11/00 |

* cited by examiner

Primary Examiner — Matthew C Bella
Assistant Examiner — Kathleen M Broughton
(74) Attorney, Agent, or Firm — Rosenberg, Klein & Lee

(57) ABSTRACT

The present invention relates to a method for size estimation by image recognition of a specific target using a given scale. First, a reference objected is recognized in an image and the corresponding scale is established. Then the specific target is searched and the size of the specific target is estimated according to the acquired scale.

12 Claims, 6 Drawing Sheets

METHOD FOR SIZE ESTIMATION BY IMAGE RECOGNITION OF SPECIFIC TARGET USING GIVEN SCALE

FIELD OF THE INVENTION

The present invention relates generally to a method for image recognition, and particularly to a method for size estimation by image recognition of a specific target using a given scale.

BACKGROUND OF THE INVENTION

In recent years, as the weather change becomes severe and compound disasters occur frequently, the Water Resource Agency has devoted to water disaster prevention for years. As the technologies of artificial intelligence (AI), big data analysis, cloud service, image recognition, and AIoT are developed and become mature, the Water Resource Agency plans to apply advanced technologies to water disaster prevention, enhancement in the capability of disaster prevention, and fulfilling automation and intellectualization of disaster prevention. For example, in a flood event caused by typhoon or heavy rain, to make sure the influence of the flood event on traffic, the deep learning technology is integrated with the road surveillance system for developing a cloud service of automatic image recognition for the flood depth on roads. By integrating the road surveillance cameras, an automatic flood notification system using image recognition can be built. Thereby, the real-time flood conditions of roads can be acquired.

Since the number of images created by the Water Resource Agency and supplied from other institutions, such as the monitoring centers of the River Management Offices, the water information centers of local governments, the Taiwan Power Company, and the Directorate General of Highways, is more than 2,000, it is difficult to monitor by men. In recent years, although various image recognition technologies have been adopted by the Water Resource Agency in monitoring water information such as water level and flow rate, it is still difficult to master the flood conditions completely. Currently, the flood conditions are mostly acquired by the notifications from the general public. Nowadays, the Directorate General of Highways integrates the deep learning technology and the road surveillance system for detecting the flood condition using image recognition. Unfortunately, it is still not possible to assess the flood region beyond roads. In addition, there is no assessment method for the area of other natural disasters by using image recognition. Thereby, it is required to integrate road surveillance systems of local governments and AI technologies for image recognizing specific targets. Then the distribution and conditions of local disasters can be acquired.

Accordingly, the present invention provides a method for size estimation by image recognition of a specific target using a given scale. A reference object and a target object are acquired by image extraction. By using the reference object, the scale will be deduced. Then, using the scale, the size of the target object in the extracted image can be estimated.

SUMMARY

An objective of the present invention is to provide a method for size estimation by image recognition of a specific target using a given scale. An extracted image is acquired from a predetermined height over a predetermined region. By judging the reference object and the reference size, the corresponding scale will be deduced. Then the scale is used to estimate the real size of the target object in the extracted image using an image recognition method.

To achieve the above objectives, the present invention discloses a method for size estimation by image recognition of a specific target using a given scale. First, an image extraction unit extracts an image at a predetermined height on a predetermined region and produces an extracted image. The extracted image includes one or more reference object and a target object. Then, use an operational device to read image data from a storage device. Afterwards, the operational device identifies the one or more reference object on the extracted image according to the image data. The image data include the one or more reference object and a plurality of reference sizes of the one or more reference object at the predetermined height. Finally, the operational device selects one of the plurality of reference sizes as a scale and estimates the size of the target object on the extracted image. Thereby, the accuracy of estimating the size of physical objects or scenes using the image recognition method can be improved.

According to an embodiment of the present invention, the predetermined height is a first height, a second height, a third height, or a fourth height. The operational device reads the plurality of reference sizes according to the first height, the second height, the third height, or the fourth height.

According to an embodiment of the present invention, the scale is an area, a height, or a volume.

According to an embodiment of the present invention, in the step of using an image extraction unit to extract an image at a predetermined height on a predetermined region, the image extraction unit is further disposed on a base, a ground vehicle, or a unmanned aerial vehicle.

According to an embodiment of the present invention, before the step of using an operational device to read image data from a storage device, the method further comprises a step of using the operational device to perform space conversion on the extracted image and a step of using the operational device to perform object image enhancement on the extracted image.

According to an embodiment of the present invention, in the step of using the operational device to perform space conversion on the extracted image, the operational device generates a corresponding image label of the one or more reference object and analyzes the spatial location of the one or more reference object.

According to an embodiment of the present invention, in the step of using the operational device to perform object image enhancement on the extracted image, the operational device renders the image colors of the one or more reference object and adjusts one or more object model of the image data.

To achieve the above objectives, the present invention further discloses a method for size estimation by image recognition of a specific target using a given scale. First, an image extraction unit extracts an image at a predetermined height on a predetermined region and produces an extracted image. The extracted image includes one or more reference object and a target object. Then, use an operational device to identify the one or more reference object on the extracted image according to reference image data. The reference image data include one or more fixed reference size. Finally, the operational device uses the fixed reference size of the one or more reference object as a scale and estimates the size of the target object on the extracted image. Thereby, the accuracy of estimating the size of physical objects or scenes using the image recognition method can be improved.

According to another embodiment of the present invention, the predetermined height is a first height, a second height, a third height, or a fourth height. The operational device reads the plurality of reference sizes according to the first height, the second height, the third height, or the fourth height.

According to another embodiment of the present invention, the scale is an area, a height, or a volume.

According to another embodiment of the present invention, in the step of using an image extraction unit to extract an image at a predetermined height on a predetermined region, the image extraction unit is further disposed on a base, a ground vehicle, or a unmanned aerial vehicle.

According to another embodiment of the present invention, before the step of using an operational device to identify the one or more reference object on the extracted image according to reference image data, the method further comprises a step of using the operational device to perform space conversion on the extracted image and a step of using the operational device to perform object image enhancement on the extracted image.

According to another embodiment of the present invention, in the step of using the operational device to perform space conversion on the extracted image, the operational device generates a corresponding image label of the one or more reference object and analyzes the spatial location of the one or more reference object.

According to another embodiment of the present invention, in the step of using the operational device to perform object image enhancement on the extracted image, the operational device renders the image colors of the one or more reference object and adjusts one or more object model of the image data.

DETAILED DESCRIPTION

In order to make the structure and characteristics as well as the effectiveness of the present invention to be further understood and recognized, the detailed description of the present invention is provided as follows along with embodiments and accompanying figures.

Given the influence of the positioning technology according to the prior art on reliability, the present invention provides a method for size estimation by image recognition of a specific target using a given scale for solving the problem of accuracy caused by the image recognition technology according to the prior art.

In the following, the properties, the structure, and the method in the method for size estimation by image recognition of a specific target using a given scale according to the present invention will be further described.

Figure 1:
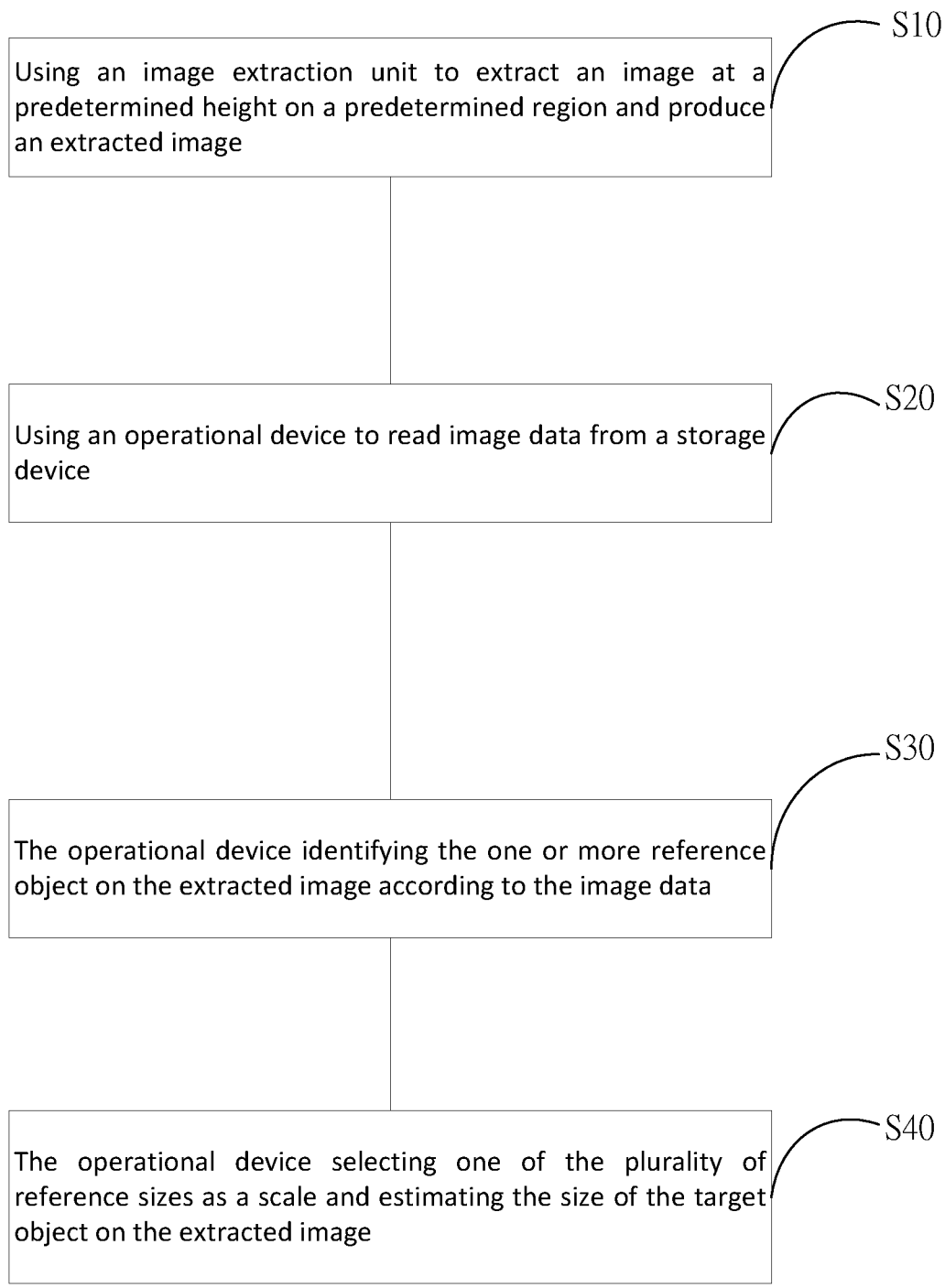
FIG. 1 shows a flowchart according an embodiment of the present invention.

First, please refer to FIG. 1, which shows a flowchart according an embodiment of the present invention. As shown in the figure, the method in the method for size estimation by image recognition of a specific target using a given scale according to the present invention comprises steps of:

Step S10: Using an image extraction unit to extract an image at a predetermined height on a predetermined region and produce an extracted image;

Step S20: Using an operational device to read image data from a storage device;

Step S30: The operational device identifying the reference object on the extracted image according to the image data; and Step S40: The operational device selecting a reference size as a scale and estimating the size of the target object.

Figure 2:
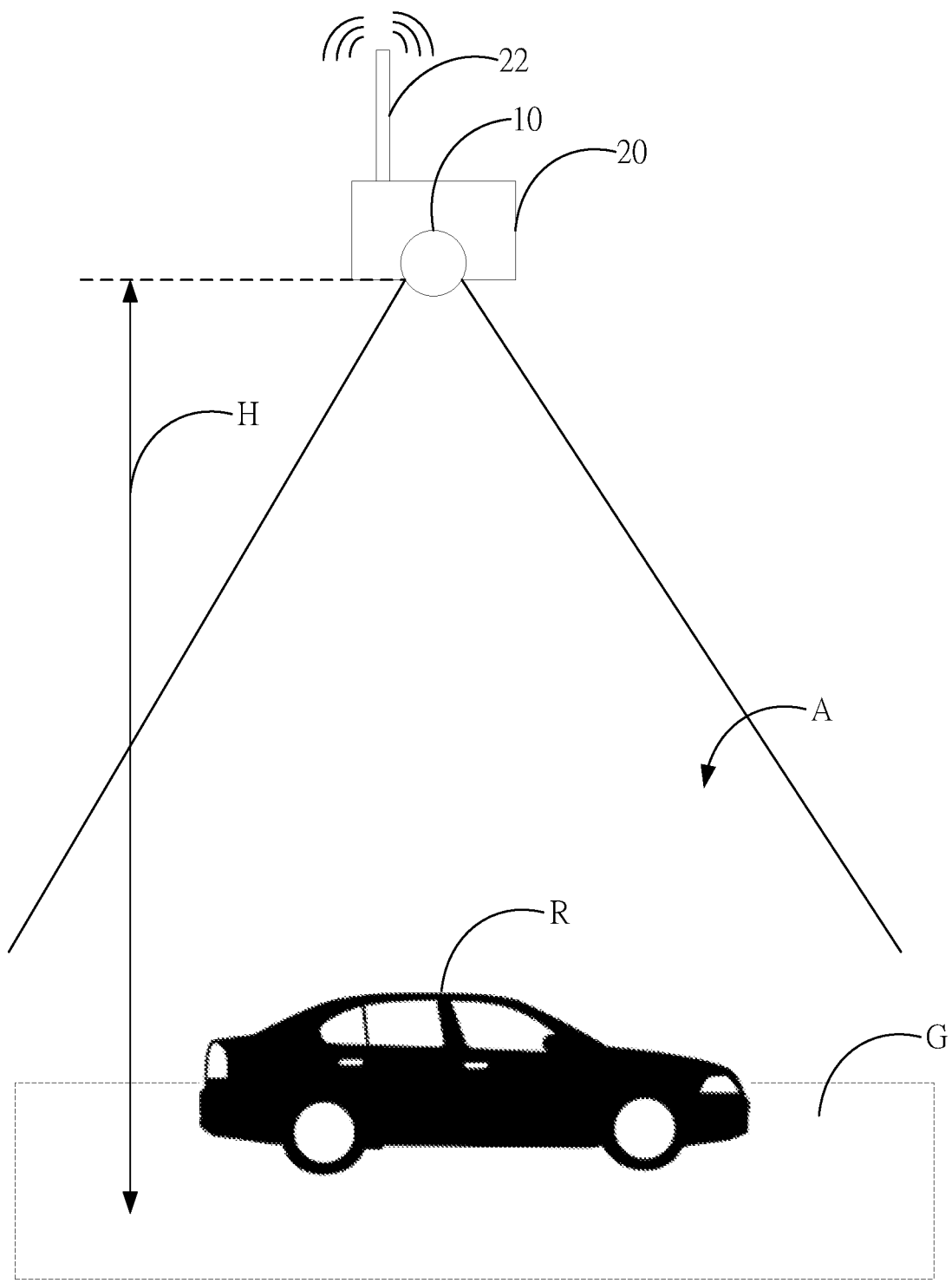
FIG. 2 shows a schematic diagram of the image extraction system according an embodiment of the present invention.
Figure 3:
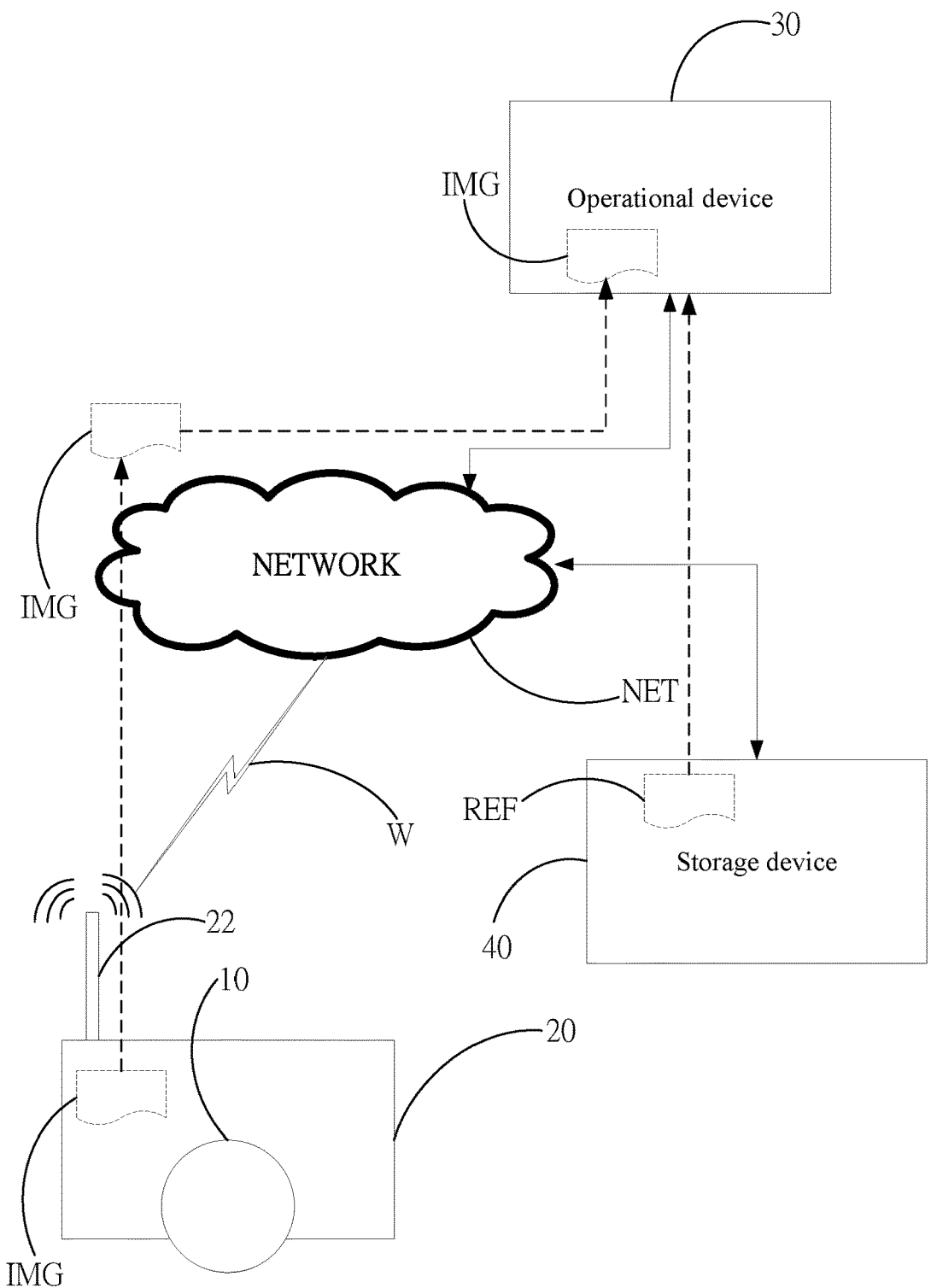
FIG. 3 shows a schematic diagram of the image extraction system according an embodiment of the present invention.

Please refer to FIG. 2 and FIG. 3, which show schematic diagrams of the image extraction system according an embodiment of the present invention. As shown in the figures, the recognition system 1 adopted in the method for size estimation by image recognition of a specific target using a given scale according to the present invention comprises an image extraction unit 10, a first electronic device 20, and an operational device 30. The extraction unit 10 is a camera, a video recorder, or a video monitor used for extracting or streaming images. The first electronic device 20 is a control box for street surveillance disposed at a traffic light (not shown in the figures). Thereby, the image extraction unit 10 according to the present embodiment is a street surveillance camera. The first electronic device 20 is connected to the operational device 30 via the network NET. Thereby, the operational device 30 can receive the extracted image IMG provided by the first electronic device 20. According to the present embodiment, the operational device 30 is a server, a personal computer, or an electronic device having image processing functions. According to the present embodiment, the first electronic device 20 is connected to a transmission unit 22. By using the wireless transmission interface W, the extracted image IMG extracted by the image extraction unit 10 is transmitted to the operational device 30 via the network NET. Nonetheless, the present invention is not limited to the embodiment. Alternatively, by using the wired transmission interface (not shown in the figures), the extracted image IMG can be transmitted to the operational device 30 via the network NET. The operational device 30 is connected to a storage device 40 via the network NET. The storage device 40 stores reference image data REF. According to the present embodiment, the storage device 30 is a database device.

In the step S10, refer to FIG. 2, the image extraction unit 20 disposed in the first electronic device 20 extracts an image at a predetermined height H on a predetermined region A. Thereby, as shown in FIG. 3, the extraction unit 10 in the first electronic device 20 generates the extracted image IMG. According to the present embodiment, the extracted image IMG includes one or more reference object R and a target object G. According to the present embodiment, the reference object R is a car and the target object G is the road run along by the reference object R. Since the image extraction unit 10 according to the present embodiment is a street surveillance camera, the image extraction region of the image extraction unit 10 is a surveillance region with a fixed area, namely, the predetermined region A. Besides, the predetermined height H according to the present embodiment is 5 meters. In the step S20, the operator of the recognition system 1 uses the operational device 30 to read the reference image data REF from the storage device 40 as the recognition reference in the subsequent steps. The reference image data REF include the one or more reference object R and a plurality of reference sizes of the one or more reference object R at the predetermined height H.

In the step S30, the operational device 30 compares with the reference image data REF read in the step S20 and hence identifying the reference object R and the corresponding reference size. Thereby, the corresponding scale can be deduced. For example, the length of a general car is between 3.5 and 4.5 meters; the height is between 1.5 and 1.8 meters; and the width is between 1.8 and 2.2 meters. By comparing the size of a general car on the extracted image IMG with the actual size, the scale of the extracted image IMG, for example, 1:100, can be estimated. Consequently, the actual size of the target object G can be recognized.

According to the above embodiment, the first electronic device 20 is a street surveillance camera administrated by the Directorate General of Highways. In addition, the present invention can be further applied to an unmanned vehicles as the first electronic device 20, for example, a drone. The extracted image IMG is acquired by aerial imaging. Moreover, in addition to direct image recognition, the extracted image IMG can be enhanced in advanced for improving the recognition rate, as described in the following.

Figure 4:
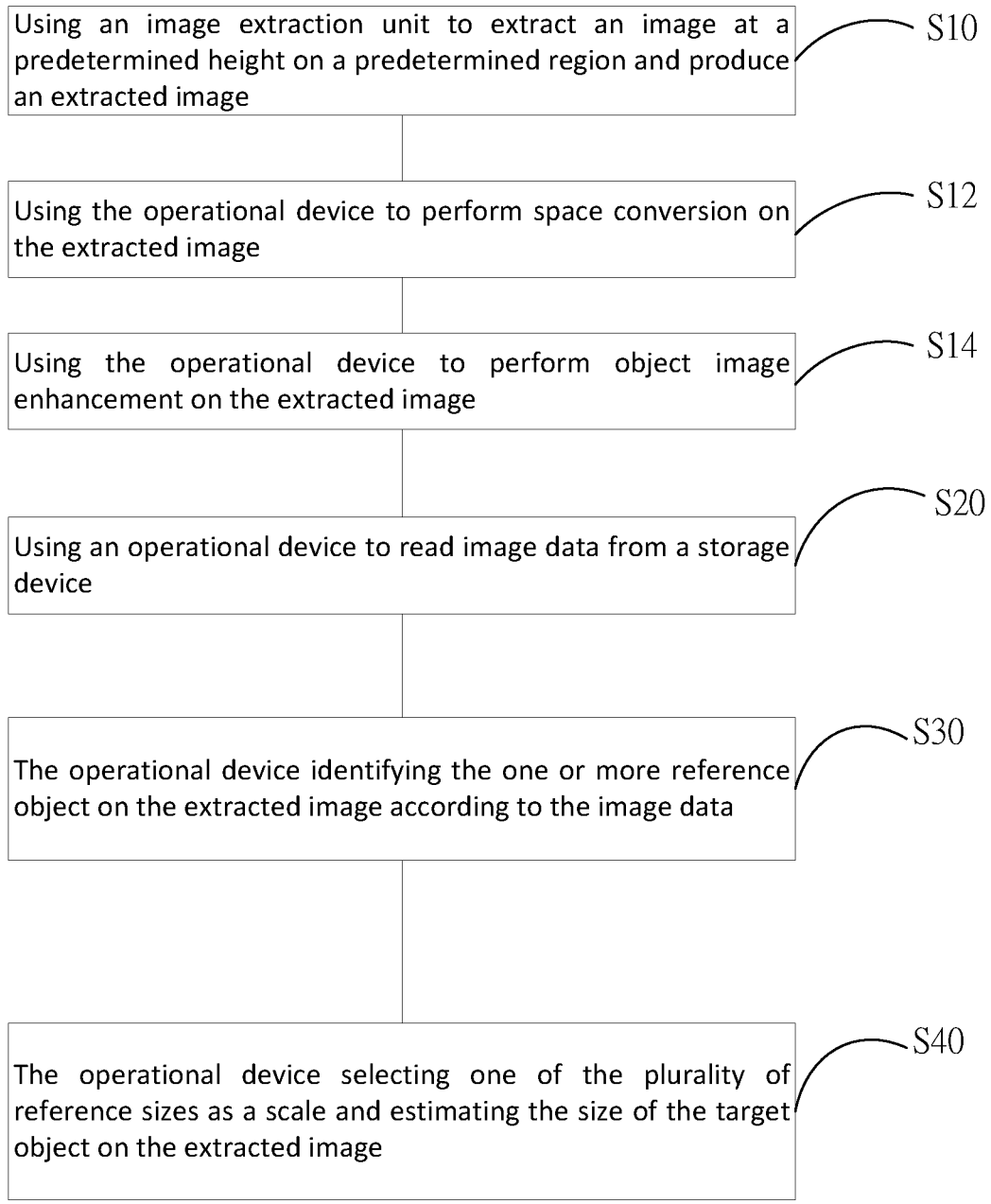
FIG. 4 shows a flowchart according another embodiment of the present invention.

Please refer to FIG. 4, which shows a flowchart according another embodiment of the present invention. The difference between FIG. 1 and FIG. 4 is that FIG. 4 further comprises a step of using the operational device to perform space conversion on the extracted image and a step of using the operational device to perform object image enhancement on the extracted image. As shown in the figure, the method for size estimation by image recognition of a specific target using a given scale according to the present invention further comprises steps of:

Step S12: Using the operational device to perform space conversion on the extracted image; and Step S14: Using the operational device to perform object image enhancement on the extracted image.

The step S10 and the steps S20 to S40 have been disclosed in the previous embodiment. Hence, the details will not be described again. As shown in the step S12 and referring to FIG. 2 and FIG. 3, after the operational device 30 receives the extracted image IMG transmitted by the first electronic device 20, the operation device 30 recognizes the reference object REF, generates the corresponding image label, and analyzes the spatial location of the reference object R. This step is to prevent visual change in size due to the angle of the ground. For example, if the reference object R is on a slope, the length will shrink while viewing downward and thus leading to error in the scale. Thereby, the scale recognition should be further adjusted. For example, the scale will be modified to 1:110 in the step S30.

In the step S14, the object to be recognized, namely, the reference object R and the target object G, are not highlighted. Thereby, the operational unit (not shown in the figure) of the operation device 30 executes a color rendering program for enhancing the colors of the objects. For example, the colors are enhanced or maximized. Hence, the image colors of the reference object R are rendered and the object model of the reference image data REF is adjusted.

In the above embodiment, the operational device 30 adjusts the extracted image IMG and the reference image data REF for improving image recognition and hence enhancing accuracy in recognizing the scale.

Alternatively, the operational device 30 can refer to a fixed reference size for recognizing a fixed reference object. The details will be described in the following.

Figure 5:
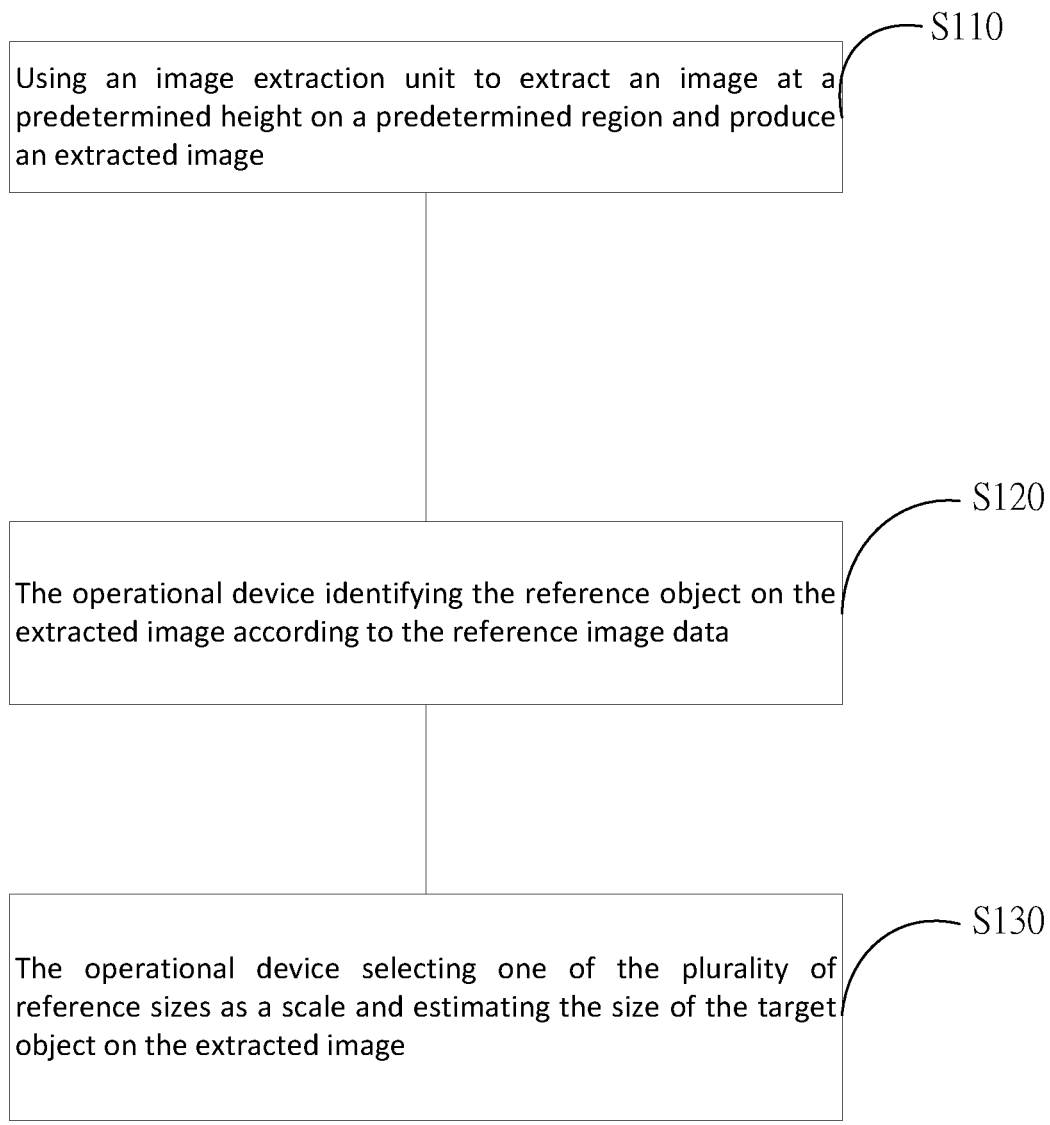
FIG. 5 shows a flowchart according another embodiment of the present invention.

Please refer to FIG. 5, which shows a flowchart according another embodiment of the present invention. As shown in the figure, the method in the method for size estimation by image recognition of a specific target using a given scale according to the present invention comprises steps of:

Step S110: Using an image extraction unit to extract an image at a predetermined height on a predetermined region and produce an extracted image;

Step S120: The operational device identifying the reference object on the extracted image according to the reference image data; and Step S130: The operational device selecting a reference size as a scale and estimating the size of the target object.

The step S110 is equivalent to the above step S10; the step S130 is equivalent to the above step S40. Hence, the details will not be described again. In the step S120, referring to FIG. 2 and FIG. 3, the operational device 30 does not read data form the storage device 40. Instead, the internal default reference image data REF is adopted as the reference for identifying the scale. Thereby, the scale is roughly estimated using the reference object R in the extracted image IMG. For example, the compromised length, width, and height of a general car are 4, 1.9, and 1.6 meters. Then the scale of the extracted image IMG is estimated to be 1:105. This scale is next adopted for estimating the actual size of the target object G in the step S130.

Figure 6:
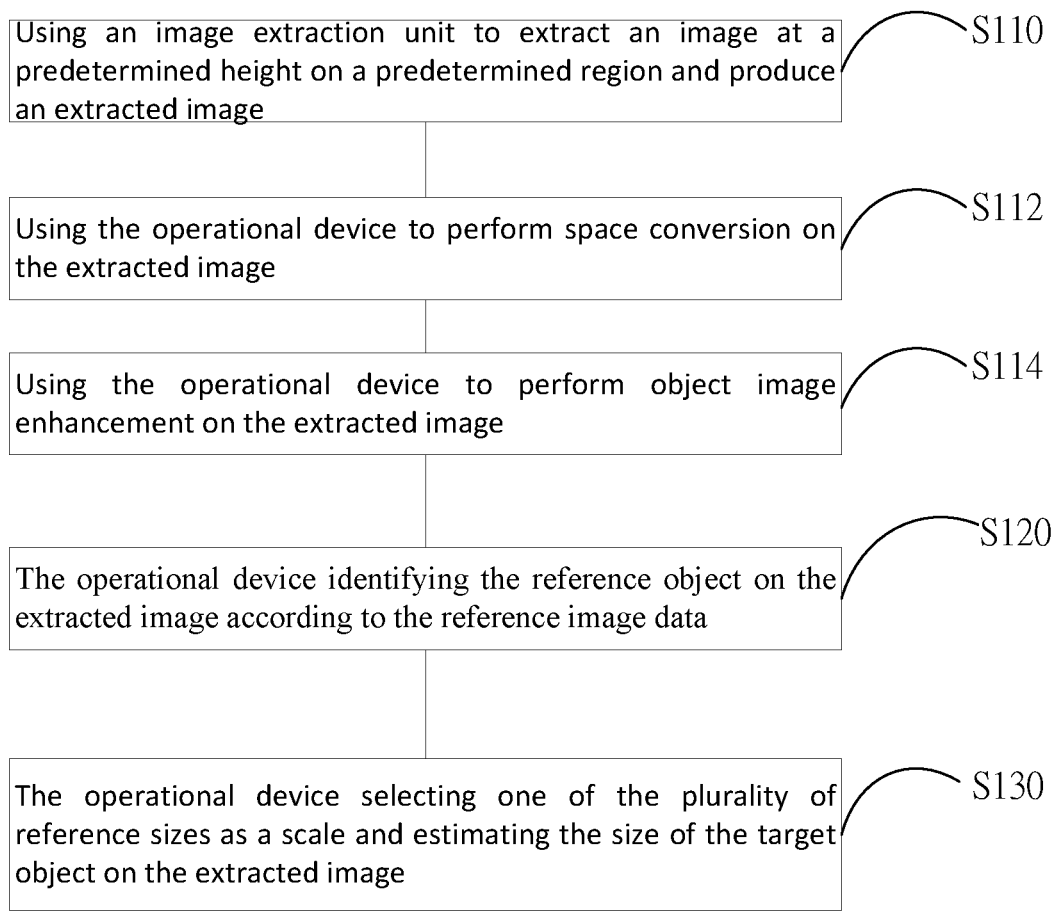
FIG. 6 shows a flowchart according another embodiment of the present invention.

Moreover, according to the present invention, visual size correction and color rendering can be performed on the reference object for improving image recognition efficiency, as shown in FIG. 6. The difference between FIG. 5 and FIG. 6 is that FIG. 6 further comprises steps of:

Step S112: Using the operational device to perform space conversion on the extracted image; and Step S114: Using the operational device to perform object image enhancement on the extracted image.

Since the steps S112 and S114 are identical to the steps S12 and S14, the details will not be repeated in this embodiment.

To sum up, in the method for size estimation by image recognition of a specific target using a given scale according to the present invention, after the image extraction unit extracts an image, the electronic device transmits the extracted image for transmitting the extracted image to the remote operational device for image recognition. By using the image recognition method, the reference object and the target object in the extracted image are identified and the scale can be deduced according to the known size of the reference object. Then the actual size of the target object can be further measured and estimated. The present invention can be applied to image size recognition such as estimating disaster area, tracking object size, and tracking disasters.

What is claimed is:

1. A method for size estimation by image recognition of a specific target using a given scale, comprising steps of:

an image extraction unit of an electronic device extracting an image from a predetermined region and produce an extracted image, and said extracted image including one or more reference object and a target object while said image extraction unit is disposed at a predetermined height, and said one or more reference object and said target object are located on said predetermined region while said image extraction unit extracts said image from said predetermined region;

an operational device receiving said extracted image transmitted by said electronic device and reading image data from a storage device, and said image data including said one or more reference object and a plurality of reference sizes of said one or more reference object;

said operational device comparing said extracted image with said image data to identify said one or more reference object on said extracted image and identify one or more corresponding reference size corresponding to said predetermined height; and said operational device adopting said corresponding reference size as a scale of said extracted image and estimating the actual size of said target object on said extracted image according to said scale;

wherein said predetermined height is a first height, a second height, a third height, or a fourth height; and said operational device reads said corresponding reference size according to said first height, said second height, said third height, or said fourth height.

2. The method for size estimation by image recognition of a specific target using a given scale of claim 1, wherein said scale is an area, a height, or a volume.

3. The method for size estimation by image recognition of a specific target using a given scale of claim 1, where in said step of using an image extraction unit to extract an image at a predetermined height on a predetermined region, said image extraction unit is further disposed on a base, a ground vehicle, or a unmanned aerial vehicle.

4. The method for size estimation by image recognition of a specific target using a given scale of claim 1, before said step of using an operational device to receive said extracted image transmitted by said electronic device and read image data from a storage device, and further comprises steps of:
using said operational device to perform space conversion on said extracted image; and
using said operational device to perform object image enhancement on said extracted image.

5. The method for size estimation by image recognition of a specific target using a given scale of claim 4, where in said step of using said operational device to perform space conversion on said extracted image, said operational device generates a corresponding image label of said one or more reference object and analyzes the spatial location of said one or more reference object.

6. The method for size estimation by image recognition of a specific target using a given scale of claim 4, where in said step of using said operational device to perform object image enhancement on said extracted image, said operational device renders the image colors of said one or more reference object and adjusts one or more object model of said image data.

7. A method for size estimation by image recognition of a specific target using a given scale, comprising steps of:
an image extraction unit of an electronic device extracting an image from a predetermined region and produce an extracted image, and said extracted image including one or more reference object and a target object while said image extraction unit is disposed at a predetermined height, and said one or more reference object and said target object are located on said predetermined region;

an operational device receiving said extracted image transmitted by said electronic device and comparing said extracted image with reference image data to identify said one or more reference object on said extracted image, said reference image data including a default reference size corresponding to said predetermined height; and said operational device adopting said default reference size at said predetermined height as a scale of said extracted image and estimating the actual size of said target object on said extracted image according to said scale;

wherein said predetermined height is a first height, a second height, a third height, or a fourth height; and said operational device reads said default reference size according to said first height, said second height, said third height, or said fourth height, said one or more reference object and said target object are located on said predetermined region while said image extraction unit extracts said image from said predetermined region.

8. The method for size estimation by image recognition of a specific target using a given scale of claim 7, wherein said scale is an area, a height, or a volume.

9. The method for size estimation by image recognition of a specific target using a given scale of claim 7, where in said step of using an image extraction unit to extract an image at a predetermined height on a predetermined region, said image extraction unit is further disposed on a base, a ground vehicle, or a unmanned aerial vehicle.

10. The method for size estimation by image recognition of a specific target using a given scale of claim 7, before said step of an operational device receiving said extracted image transmitted by said electronic device and identifying said one or more reference object on said extracted image according to reference image data including a default reference size, and further comprises steps of:
using said operational device to perform space conversion on said extracted image; and
using said operational device to perform object image enhancement on said extracted image.

11. The method for size estimation by image recognition of a specific target using a given scale of claim 10, where in said step of using said operational device to perform space conversion on said extracted image, said operational device generates a corresponding image label of said one or more reference object and analyzes the spatial location of said one or more reference object.

12. The method for size estimation by image recognition of a specific target using a given scale of claim 10, where in said step of using said operational device to perform object image enhancement on said extracted image, said operational device renders the image colors of said one or more reference object and adjusts one or more object model of said image data.

* * * * *